United States Patent
Endo

(10) Patent No.: US 7,200,706 B2
(45) Date of Patent: Apr. 3, 2007

(54) SEMICONDUCTOR INTEGRATED CIRCUIT

(75) Inventor: Nobuyuki Endo, Minato-ku (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 231 days.

(21) Appl. No.: 10/829,241

(22) Filed: Apr. 22, 2004

(65) Prior Publication Data

US 2005/0080972 A1    Apr. 14, 2005

(30) Foreign Application Priority Data

Sep. 30, 2003  (JP) ............................. 2003-340511

(51) Int. Cl.
*G06F 13/00* (2006.01)

(52) U.S. Cl. ..................... 711/100; 711/149; 711/150; 711/151

(58) Field of Classification Search ................ 711/100, 711/149, 150, 151
See application file for complete search history.

(56) References Cited

U.S. PATENT DOCUMENTS

| | | | |
|---|---|---|---|
| 5,581,698 A * | 12/1996 | Miwa et al. ................. | 714/42 |
| 2002/0184471 A1 * | 12/2002 | Hatae et al. ................. | 712/22 |
| 2003/0172225 A1 * | 9/2003 | Brown ........................ | 711/104 |
| 2004/0049293 A1 * | 3/2004 | Hadwiger et al. ............. | 700/4 |
| 2004/0064646 A1 * | 4/2004 | Emerson et al. ............. | 711/131 |

FOREIGN PATENT DOCUMENTS

JP    8-180008    7/1996

* cited by examiner

*Primary Examiner*—Stephen C. Elmore
*Assistant Examiner*—Daniel Kim
(74) *Attorney, Agent, or Firm*—Nixon Peabody LLP; Donald R. Studebaker

(57) ABSTRACT

A semiconductor integrated circuit includes a local memory permitting high-speed access. The local memory has at least first and second ports. The first port of the local memory is connected to a CPU by a first bus and the second port of the local memory is connected to an access control unit by a second bus. An external device is connected to the access control unit. When the CPU and/or the external device accesses the local memory, the CPU sends a control signal and data to the first port (CPU-access port) of the local memory via the first bus, and the access control unit sends another control signal and data to the second port (external-device-access port) of the local memory via the second bus. The local memory then executes data writing or reading based on the control signal(s) and data thus introduced to the access port(s). The external device can access the local memory via the access control unit to transfer data at high speed to and from the local memory.

20 Claims, 2 Drawing Sheets

SEMICONDUCTOR INTEGRATED CIRCUIT

BACKGROUND OF THE INVENTION

1. Field of the Invention

The present invention relates to a semiconductor integrated circuit that performs information processing by using a central processing unit (CPU), and, more particularly, to a semiconductor integrated circuit that is capable of transferring data at high speed to and from the outside.

2. Description of the Related Art

Conventionally, a CPU in a semiconductor integrated circuit that performs information processing is connected to a main memory via a bus, and is designed to transfer information to and from the outside (e.g., an external device or network) via the main memory. Because the access speed of the main memory is low (slow) in comparison with the processing speed of the CPU, the CPU is also connected to a cache memory that has a higher (faster) access speed than the main memory. The CPU accelerates information processing by temporarily storing a portion of the information stored in the main memory in the cache memory, and then delivering the information to and from the cache memory. An example of this kind of CPU is disclosed in Japanese Patent Kokai (Laid Open Publication) No. H8-180008.

In this semiconductor integrated circuit, when information is transferred to and from the external device via the main memory, the CPU is unable to transfer information at high speed because the main memory access speed is low. If the CPU has a cache memory, direct access to the cache memory from the external device may be considered. However, the cache memory requires the information stored in the cache memory to be the same as the information stored in the main memory. Therefore, it is not feasible to write and read information into and from the cache memory unless the same information is stored in the main memory.

SUMMARY OF THE INVENTION

One object of the present invention is to provide a semiconductor integrated circuit that is capable of transferring information at high speed to and from the external device.

According to one aspect of the present invention, there is provided a semiconductor integrated circuit that includes a central processing unit, a main memory control unit for controlling a main memory, and an I/O channel control unit for controlling a peripheral device. The central processing unit, main memory control unit and I/O channel control unit are connected to one another by a first bus. The semiconductor integrated circuit also includes a local memory for storing information. The local memory is connected to the central processing unit by a second bus. The semiconductor integrated circuit also includes an access controller connected to the local memory by a third bus. The access controller accesses the local memory in accordance with a request from outside (e.g., an external device or network).

The local memory preferably includes a first access port connected to the second bus and a second access port connected to the third bus. If the local memory has two access ports, the local memory can be accessed by the CPU and from the external device independently. Therefore, even when the CPU is operating, data can be transferred between the external device and the local memory. In addition, because the local memory access speed is faster that that of the main memory, data can be transferred at high speed between the semiconductor integrated circuit and the external device via the local memory.

It should be noted that the local memory may have a sole access port. Such local memory affords benefits such as a further increase in the data transfer speed and a reduced mounting area, when compared with the local memory having two access ports.

The semiconductor integrated circuit may further include a selector connected between the second and third buses and the local memory. The selector may select the second bus or the third bus, and connect the selected bus to the local memory.

In this case, the semiconductor integrated circuit preferably further includes an arbitrator device that issues instructions to the selector regarding the selection of the bus, on the basis of access requests to the local memory from the central processing unit and the access controller.

Other objects, aspects and advantages of the present invention will become apparent to those skilled in the art to which the invention pertains from the following detailed description and appended claims when read and understood in conjunction with the accompanying drawings.

DETAILED DESCRIPTION OF THE INVENTION

Embodiments of the semiconductor integrated circuit according to the present invention will be described in detail with reference to the attached drawings.

Figure 1:
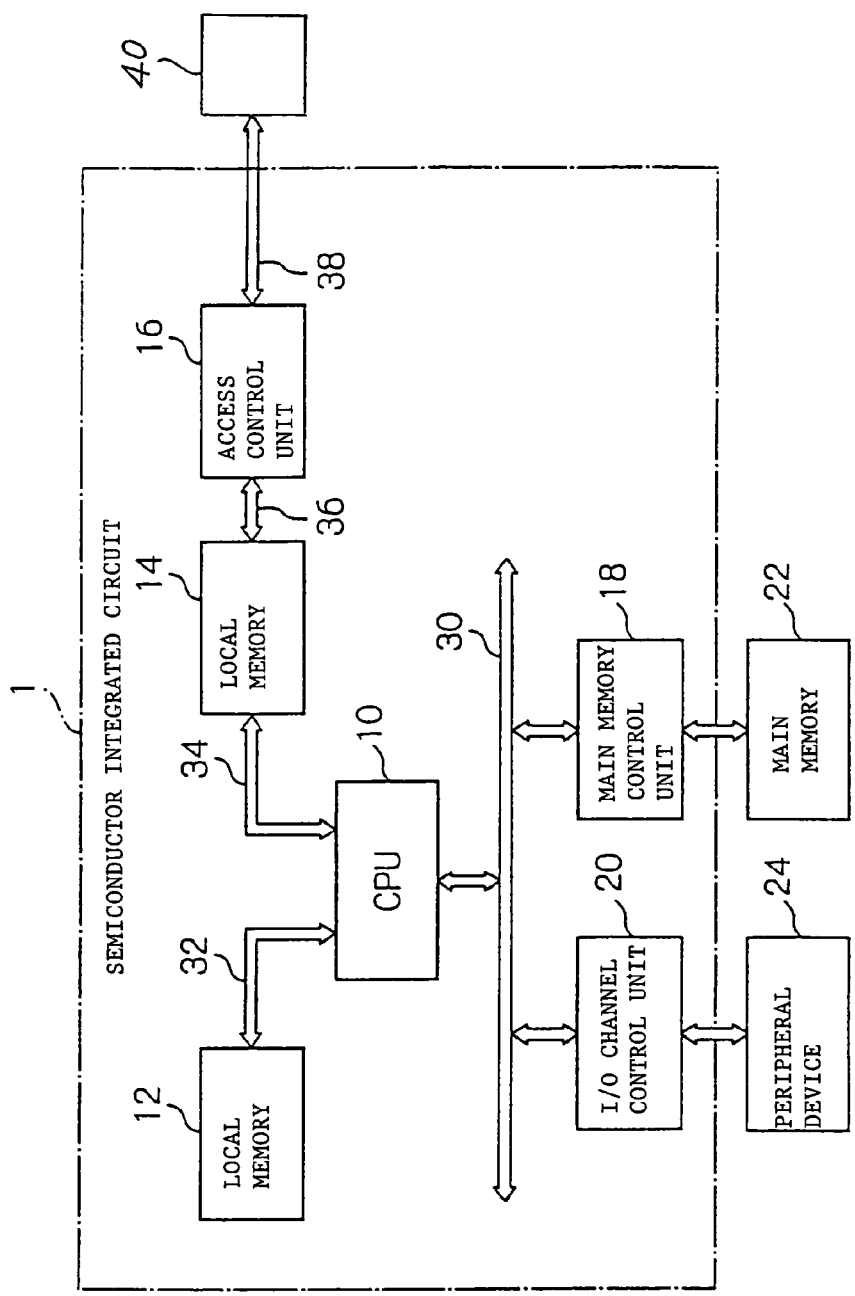
FIG. 1 is a block diagram showing an embodiment of the semiconductor integrated circuit according to the present invention.

Referring to FIG. 1, the semiconductor integrated circuit 1 includes a central processing unit (CPU) 10, local memories 12 and 14, an access control unit 16, a main memory control unit 18, and an I/O channel control unit 20. The CPU 10, main memory control unit 18, and I/O channel control unit 20 are connected to each other by a bus 30. The CPU 10 is connected to the local memories 12 and 14 by buses 32 and 34 respectively. The local memory 14 and access control unit 16 are connected to each other by a bus 36. The access control unit 16 is connected to the outside (e.g., an external device or a network) 40 by a bus 38.

A main memory 22 and peripheral device 24 provided outside the semiconductor integrated circuit 1 are connected to the main memory control unit 18 and I/O channel control unit 20 respectively. The buses 32, 36, and 38 include an address line, write data line, read data line, element select line, and/or read/write select line, for example, and thus constitute transmission channels for transmitting addresses, write data, read data, element select signals, and read/write select signals.

The CPU 10 is a computation/control device that executes predetermined processing by reading commands, data, and so forth, from the main memory 22 and generally has a built-in cache memory. The large-capacity main memory 22, which stores programs, data, and so forth, is connected to the main memory control unit 18. The main memory control unit 18 controls the reading and writing of programs, data, and so forth from and to the main memory 22 in accordance with commands from the CPU 10. The peripheral device(s)

24, such as a display and a printer, is (are) connected to the I/O channel control unit 20. The I/O channel control unit 20 controls the operation of the peripheral device(s) 24 in accordance with the commands from the CPU 10. The I/O channel control unit 20 also controls information transfer and other operations in accordance with the commands from the CPU 10.

The local memories 12 and 14 are a semiconductor memory with a smaller capacity than the main memory 22 but with a faster access speed than the main memory 22. Thus, the local memories 12 and 14 permit high-speed access. In this embodiment, the local memories 12 and 14 do not assume a cache memory function. Therefore, information that is different from the information stored in the main memory 22 can be stored in the local memories 12 and 14. The local memory 12 is constituted by, for example, a memory for storing information, such as RAM (Random Access Memory). The CPU 10 is able to access the local memory 12 at any time via the dedicated bus 32.

The local memory 14 is a memory that stores information and has at least two access ports. In this embodiment, the local memory 14 is a dual-port RAM; one port is used as a port dedicated to CPU access and the other port is used as a port dedicated to external device access. The CPU 10 is connected to the CPU-access port by the bus 34 and the access control unit 16 is connected to the external-device-access port by the bus 36. The access control unit 16 operates as an interface between the local memory 14 and the external device 40, and accesses the local memory 14 in accordance with a request from the external device 40 that is supplied via the bus 38.

The local memory 14 therefore has a CPU-access port and an external-device-access port that can each be accessed independently of the other. Hence, the CPU 10 is able to access the local memory 14 irrespective of access to the local memory 14 from the external device 40, and the local memory 14 can be accessed by the external device 40 irrespective of access to the local memory 14 by the CPU 10. Therefore, even when the CPU 10 is operating, data can be transferred between the local memory 14 and the external device 40, and data can be simultaneously read from the same address in the local memory 14 by the CPU 10 and the external device 40.

The operation of the semiconductor integrated circuit 1 will now be described.

For example, the CPU 10 writes a program with a high usage frequency to the local memory 12 and executes information processing by reading this program. When accessing the local memory 14, the CPU 10 and access control unit 16 issue data (in the case of data writing) and a control signal (address, element select signal, and read/write select signal, for example) to the local memory 14 via the buses 34 and 36, respectively.

The local memory 14 captures the data and control signal(s) from the buses 34 and 36 and executes the data writing or data reading on the basis of the data and control signal(s) thus captured. When data writing is executed, the data thus read out is output to the bus 34 or 36. The CPU 10 captures the data from the bus 34, and the access control unit 16 captures the data from the bus 36 and outputs this data to the external device 40 via the bus 38.

As described above, the local memory 14 includes a CPU-access dedicated port and an external-device-access dedicated port, so that the CPU 10 and access control unit 16 are able to access the local memory 14 independently of one another. It should be noted that, however, that this excludes simultaneous data writing to the same address from the CPU 10 and access control unit 16 (or the external device 40).

Therefore, even when the CPU 10 is accessing the local memory 14, the external device 40 can read data stored in the local memory 14. In addition, because the access speed of the local memory 14 is faster than that of the main memory 22, the external device 40 can read data stored in the local memory 14 within a short(er) time.

Figure 2:
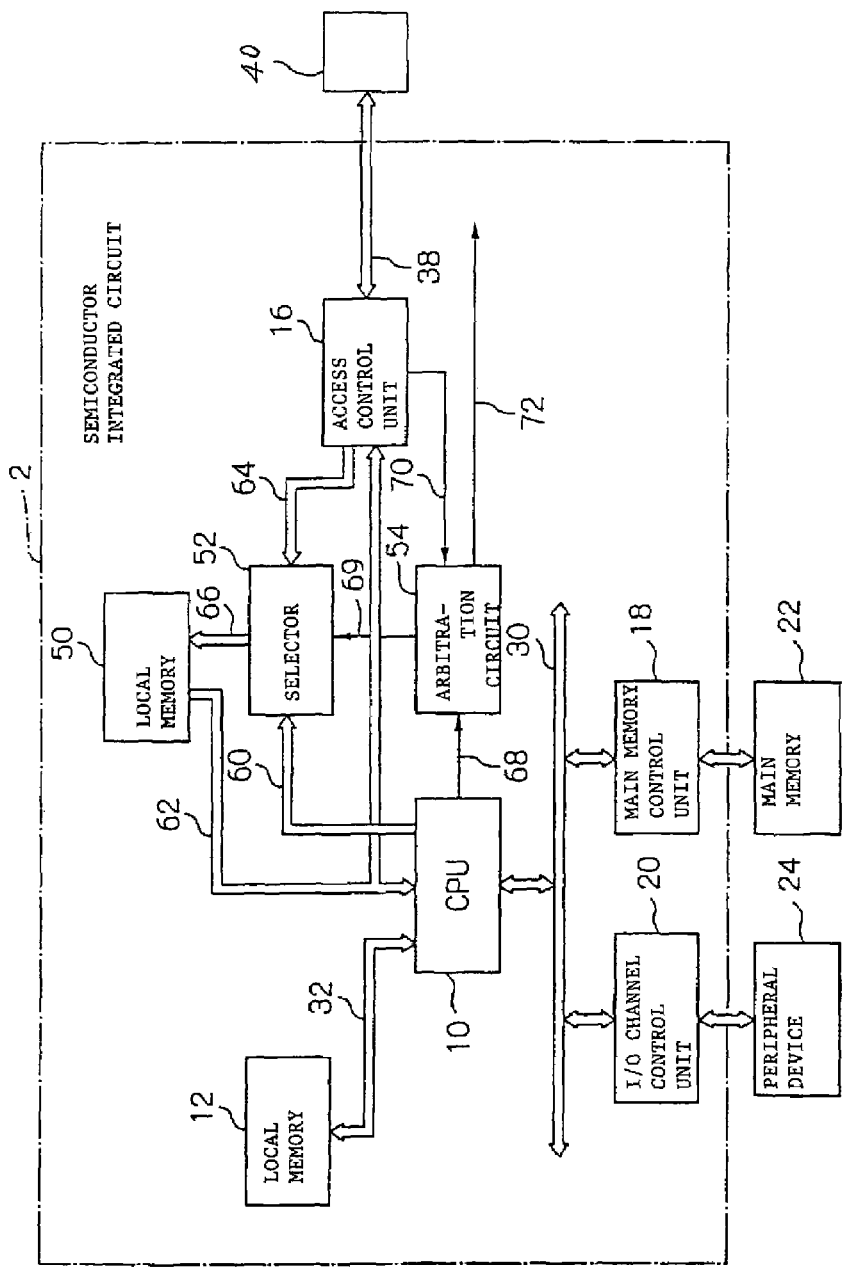
FIG. 2 is a block diagram showing another embodiment of the semiconductor integrated circuit according to the present invention.

FIG. 2 is a block diagram showing another embodiment of the semiconductor integrated circuit according to the present invention. Referring now to FIG. 2, the semiconductor integrated circuit 2 includes a local memory 50 in place of the local memory 14 of the semiconductor integrated circuit 1 shown in FIG. 1. The semiconductor integrated circuit 2 also includes the central processing unit (CPU) 10, the local memory 12, the access control unit 16, the main memory control unit 18, the I/O channel control unit 20, a selector 52, and an arbitration circuit 54. In FIGS. 1 and 2, similar reference symbols are assigned to similar elements.

Similar to the first embodiment shown in FIG. 1, the CPU 10, main memory 22, and peripheral device 24 constitute a general-purpose computer. The CPU 10 and local memory 12 are connected to each other by a bus 32. The CPU 10 and selector 52 are connected to each other by a bus 60. The CPU 10 is connected to the local memory 50 and the access control unit 16 by a bus 62. The access control unit 16 and selector 52 are connected to each other by a bus 64. The selector 52 and local memory 50 are connected to each other by a bus 66. The arbitration circuit 54 is connected to the CPU 10 and access control unit 16 by interconnects 68 and 70 respectively. The selector 52 is connected to the arbitration circuit 54 by an interconnect 69.

In this embodiment, the buses 60, 64 and 66 include write data lines for transmitting write data, address lines for transmitting addresses, element select lines, and/or read/write select lines. The bus 62 is a read data line that transmits read data (data read from the local memory 50).

Similar to the local memory 14 in FIG. 1, the local memory 50 is a memory that is mainly for storing data temporarily, such as semiconductor memory constituted by RAM. The local memory 50 has a smaller capacity than the main memory 22 but permits higher-speed access than the main memory 22. Similar to the local memory 14 in FIG. 1, the local memory 50 does not assume a cache memory function. Unlike the local memory 14, however, the local memory 50 has a sole access port. Hence, the local memory 50 cannot be accessed by the CPU 10 and the external device 40 simultaneously. The selector 52 and arbitration circuit 54 are therefore provided in this embodiment to arbitrate between an access request from the CPU 10 and an access request from the external device 40.

In the semiconductor integrated circuit 1 of FIG. 1, the local memory 14 is constituted by a dual-port RAM. Therefore, by rendering one port a CPU-access port and the other port an external-device-access port, the local memory 14 can be accessed by the CPU 10 and the external device 40 independently of one another. However, the dual-port RAM requires a larger mounting area than a single-port RAM, and operates with a slower access speed than the single-port RAM. Therefore, where emphasis is placed on the mounting area and/or the access speed, the local memory 50 constituted by a RAM with a single access port is preferred, as in this embodiment.

The selector 52 is a circuit that selectively connects either one of the bus 60 and bus 64 to the bus 66 in accordance with a select signal supplied via the interconnect 69 by the arbitration circuit 54. More specifically, the selector 52 connects the bus 60 to the bus 66 when the select signal carries an instruction to connect the CPU 10 to the local memory 50, and connects the bus 64 to the bus 66 when the select signal carries an instruction to connect the access control unit 16 to the local memory 50. Upon this selection, addresses, write data, element select signals and read/write select signals that are output by the CPU 10 or access control unit 16 are introduced to the local memory 50, and data writing or reading is executed in the local memory 50.

In this embodiment, when desiring access to the local memory 50, the CPU 10 and access control unit 16 issue an access request signal (e.g., an element select signal) to the arbitration circuit 54 via the interconnects 68 and 70. The arbitration circuit 54 generates a select signal for connecting either of the CPU 10 and access control unit 16 to the local memory 50 on the basis of the access request signal that is supplied from the CPU 10 and access control unit 16. The arbitration circuit 54 then sends this select signal to the selector 52.

More specifically, upon (or prior to) receiving an access request signal from either the CPU 10 or the access control unit 16, the arbitration circuit 54 determines whether the local memory 50 is executing data reading or writing, or not. If the local memory 50 is executing neither the data reading nor writing, the arbitration circuit 54 generates a select signal instructing a connection between the bus 66 and the bus 60 or 64 (the bus 60 when the CPU 10 makes the access request, and the bus 64 when the access control unit 16 makes the access request) and then supplies this select signal to the selector 52. When access request signals are received simultaneously from the CPU 10 and access control unit 16, the access request from the CPU 10 is prioritized, and thus a select signal instructing a connection between the bus 60 and bus 66 is generated and delivered to the selector 52. The arbitration circuit 54 generates a selection display signal (or selection result signal) indicating the result of selection of the bus 60 or 64, and sends it to the external device 40 via an interconnect 72. It should be noted that the arbitration circuit 54 may give priority to the access request from the access control unit 16 when there is a conflict between access requests from the CPU 10 and access control unit 16.

The operation of the semiconductor integrated circuit 2 will now be described. When desiring access to the local memory 50, the CPU 10 and access control unit 16 issue an access request signal to the arbitration circuit 54 via the interconnects 68 and 70 respectively, and send addresses, write data (in the case of data writing), element select signals, read/write select signals, and so forth, to the buses 60 and 64 (or to the selector 52) respectively.

When an access request signal is issued to the arbitration circuit 54 from the CPU 10, and the local memory 50 is not currently being accessed by the access control unit 16, the arbitration circuit 54 outputs a select signal instructing a connection between the buses 60 and 66 to the selector 52. When an access request signal is issued from the access control unit 16, and the local memory 50 is not being accessed by the CPU 10 and there is no conflict with an access request from the CPU 10, the arbitration circuit 54 outputs a select signal instructing a connection between the buses 64 and 66 to the selector 52. Then the arbitration circuit 54 outputs a selection result signal to the external device 40 via the interconnect 72. The external device 40 can determine from this selection result signal whether the local memory 50 is being accessed by the CPU 10.

The selector 52 connects the bus 66 to the bus 60 or bus 64 in accordance with a select signal from the arbitration circuit 54. Accordingly, the addresses, write data, element select signals, and read/write select signals that are present on the bus 60 or bus 64 from the CPU 10 or access control unit 16 are then introduced to the local memory 50 via the selector 52. The local memory 50 executes data writing or data reading based on the inputted addresses, write data, element select signals, and read/write select signals. When data is read, the local memory 50 outputs this data to the bus 62. Then, the CPU 10 or access control unit 16, which has made the access request, captures the data on the bus 60. The access control unit 16 sends the captured data to the external device 40 via the bus 38.

Therefore, according to this embodiment, when the CPU 10 is not accessing the local memory 50, the local memory 50 can be directly accessed by the external device 40 even when the CPU 10 is operating, and hence data stored in the local memory 50 can be read by the external device 40 and data can be written to the local memory 50 by the external device 40. Because the access speed of the local memory 50 is faster than that of the main memory 22, the external device 40 can read the data stored in the local memory 50 at high speed.

This application is based on a Japanese patent application No. 2003-340511, and the entire disclosure thereof is incorporated herein by reference.

What is claimed is:

1. A semiconductor integrated circuit comprising:
a central processing unit;
a main memory control unit for controlling a main memory;
an I/O channel control unit for controlling a peripheral device;
a first bus for connecting the central processing unit, main memory control unit and I/O channel control unit to each other;
a local memory for storing information;
a second bus for connecting the local memory to the central processing unit;
an access control means for accessing the local memory in response to a request from outside; and
a third bus for directly connecting the local memory to the access control means.

2. The semiconductor integrated circuit according to claim 1, wherein the local memory includes a first access port connected to the second bus and a second access port connected to the third bus.

3. The semiconductor integrated circuit according to claim 2, wherein the local memory is a dual-port RAM having the first end second access ports.

4. The semiconductor integrated circuit according to claim 2, wherein the local memory is RAM with an access port on one side.

5. The semiconductor integrated circuit according to claim 1, wherein the local memory has a smaller capacity than the main memory but has a higher access speed than the main memory.

6. A semiconductor integrated circuit comprising:
a central processing unit;
a main memory control unit for controlling a main memory;
an I/O channel control unit for controlling a peripheral device;
a first bus for connecting the central processing unit, main memory control unit and I/O channel control unit to each other;
a local memory for storing information;

a second bus for connecting the local memory to the central processing unit;

an access control means for accessing the local memory in response to a request from outside;

a third bus for connecting the local memory to the access control means; and selection means connected between the second and third buses and the local memory for selecting the second bus or the third bus so as to connect the selected bus to the local memory.

7. The semiconductor integrated circuit according to claim 4, further comprising arbitration means for issuing an instruction to the selection means regarding selection of the second or third bus, on the basis of a request to access the local memory from the central processing unit and a request to access the local memory from the access control means.

8. The semiconductor integrated circuit according to claim 5, wherein the arbitration means prioritizes the access request from the central processing unit over the access request from the access control means.

9. The semiconductor integrated circuit according to claim 5, wherein the arbitration means prioritizes the access request from the access control means over the access request from the central processing unit.

10. The semiconductor integrated circuit according to claim 5, wherein the arbitration means generates and issues a selection result signal, which indicates the selected bus, to the outside.

11. A semiconductor integrated circuit comprising:
a central processing unit;
a main memory controller for controlling a main memory;
an I/O channel controller for controlling a peripheral device;
a first bus for connecting the central processing unit, main memory controller and I/O channel controller to each other;
a local memory for storing information;
a second bus for connecting the local memory to the central processing unit;
an access controller for accessing the local memory in response to a request from outside; and
a third bus for directly connecting the local memory to the access controller.

12. The semiconductor integrated circuit according to claim 11, wherein the local memory includes a first access port connected to the second bus and a second access port connected to the third bus.

13. The semiconductor integrated circuit according to claim 12, wherein the local memory is a dual-port RAM having the first and second access ports.

14. The semiconductor integrated circuit according to claim 12, wherein the local memory is RAM with an access port on one side.

15. The semiconductor integrated circuit according to claim 11, wherein the local memory has a smaller capacity than the main memory but has a higher access speed than the main memory.

16. A semiconductor integrated circuit comprising:
a central processing unit;
a main memory controller for controlling a main memory;
an I/O channel controller for controlling a peripheral device;
a first bus for connecting the central processing unit, main memory controller and I/O channel controller to each other;
a local memory for storing information:
a second bus for connecting the local memory to the central processing unit;
an access controller for accessing the local memory in response to a request from outside;
a third bus for connecting the local memory to the access controller; and a selector connected between the second and third buses and the local memory for selecting the second bus or the third bus so as to conned the selected bus to the local memory.

17. The semiconductor integrated circuit according to claim 14, further comprising an arbitration circuit for issuing an instruction to the selector regarding selection of the second or third bus, on the basis of an access request to the local memory from the central processing unit and an access request to the local memory from the access controller.

18. The semiconductor integrated circuit according to claim 15, wherein the arbitration circuit prioritizes the access request from the central processing unit over the access request from the access controller.

19. The semiconductor integrated circuit according to claim 15, wherein the arbitration circuit prioritizes the access request from the access controller over the access request from the central processing unit.

20. The semiconductor integrated circuit according to claim 15, wherein the arbitration means generates and issues a selection result signal, which indicates the selected bus, to the outside.

* * * * *